United States Patent
Gergle et al.

[15] 3,663,002
[45] May 16, 1972

[54] DYNAMIC DAMPER

[72] Inventors: Robert G. Gergle, Troy; Zdravko D. Dobrasevic, Detroit, both of Mich.

[73] Assignee: Chrysler Corporation, Highland Park, Mich.

[22] Filed: Aug. 31, 1970

[21] Appl. No.: 68,702

[52] U.S. Cl. ................................................267/136, 267/8
[51] Int. Cl. ..............................................................F16f 1/36
[58] Field of Search ..............................267/8 D, 136, 57.1 R

[56] References Cited

UNITED STATES PATENTS 2,081,536  5/1937  Gustafson..............................267/136
3,520,554  7/1970  Ravenel............................267/57.1 R Primary Examiner—James B. Marbert
Attorney—Talburtt and Baldwin

[57] ABSTRACT

Tuned mass adapted to be connected to vehicle body to dampen body vibrations.

4 Claims, 4 Drawing Figures

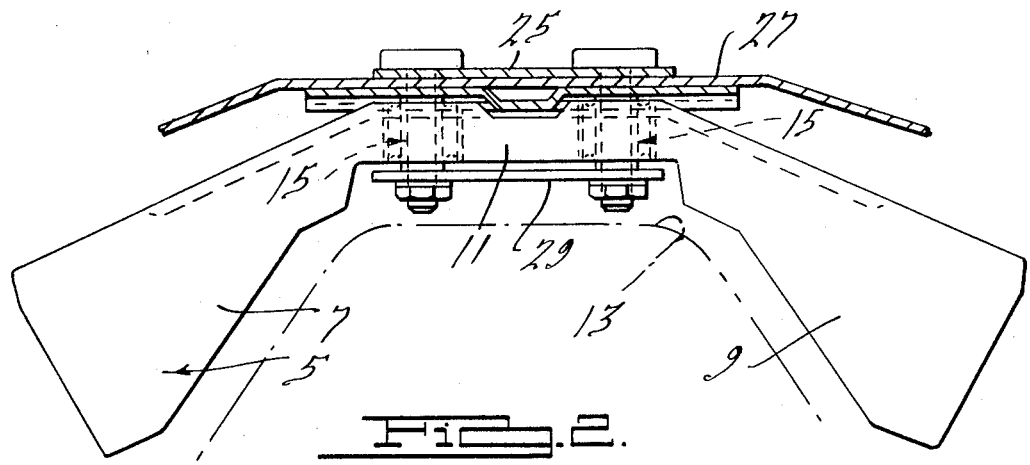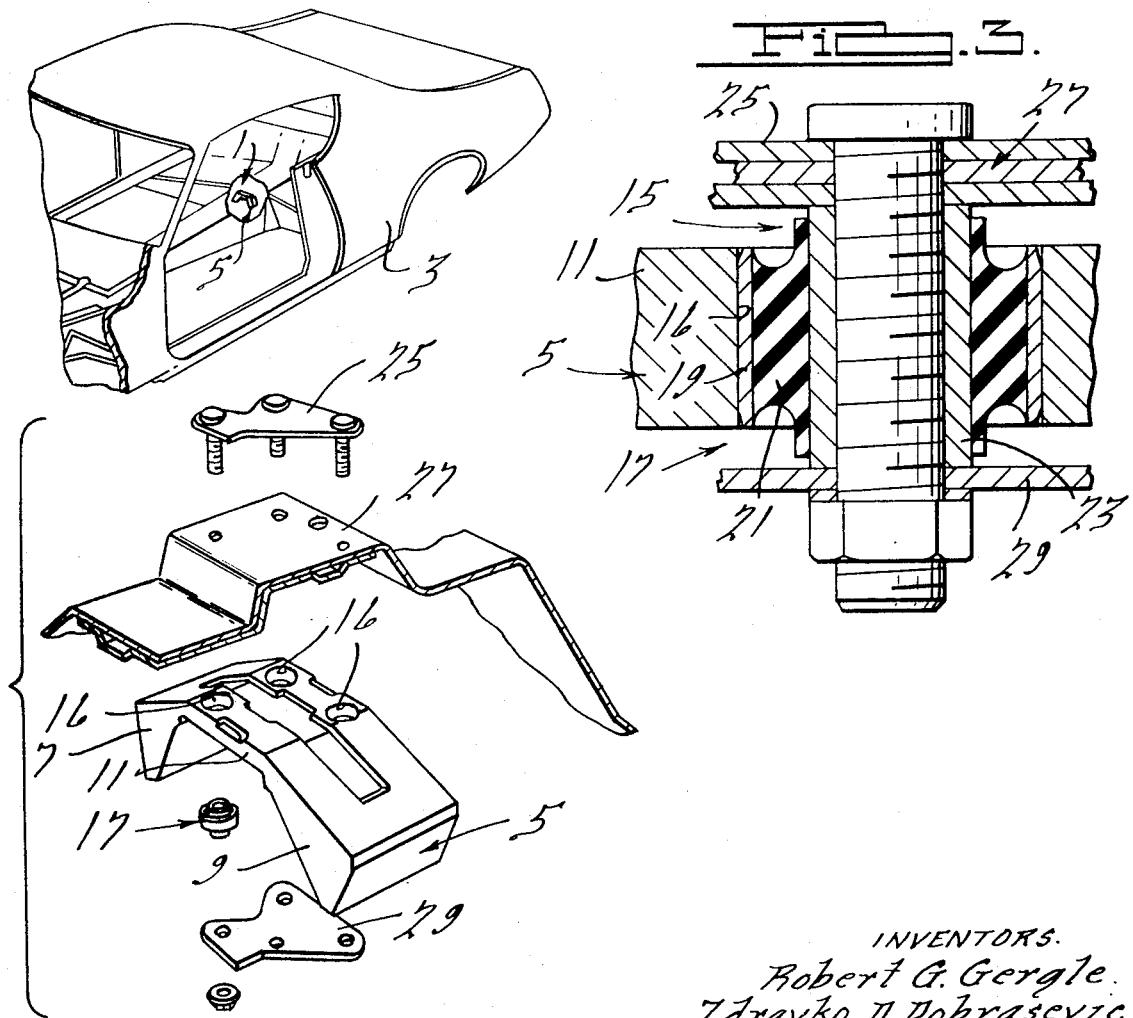

3,663,002

DYNAMIC DAMPER

BACKGROUND OF THE INVENTION

This invention relates to automotive vehicles, and more particularly to devices for preventing vibration induced body noise from becoming objectionable.

It is known that vehicle body structures vibrate significantly due to movement of the vehicle along the road. When certain frequencies are reached the noise created by the vibrating body becomes clearly audible and objectionable to the vehicle occupants. The vibrations are initially induced due to several factors, such as rough road conditions or tire nonconformities for example. Other vehicle components, such as the suspension utilized may contribute to the creation of objectionable vibration noise. The present invention overcomes many of the problems heretofore presented in this area.

BRIEF SUMMARY OF THE INVENTION

Briefly, this invention comprises a tuned mass adapted to be connected to a vehicle body.

One of the primary objects of this invention is to provide a device for preventing body vibrations in a predetermined range from causing objectionable noise in the passenger compartment of a vehicle.

Another object of this invention is to provide a device of the class described for damping vibrations in a vehicle body.

A further object of this invention is to provide a device such as described which may be easily secured to the vehicle body.

Another object of this invention is to provide a device such as described which dampens or tunes out certain noise frequencies caused by rough roads and tire nonuniformities.

Still another object of this invention is to provide a device such as described which is economical in construction and effective in operation.

Other objects and advantages in this invention will be made apparent as the description progresses.

BRIEF DESCRIPTION OF THE DRAWINGS

In the accompanying drawings, in which one of various possible embodiments is illustrated, FIG. 1 is a perspective view of a vehicle body having a device constructed in accordance with this invention attached thereto, certain parts being broken away for clarity;

FIG. 2 is an enlarged elevation of a device of this invention, certain vehicle parts being shown in section;

FIG. 3 is an enlarged section taken through one of the members connecting the device to the vehicle; and FIG. 4 is an expanded perspective view of a device of this invention.

Like parts are shown by corresponding reference characters through the several views of the drawings.

DESCRIPTION OF THE PREFERRED EMBODIMENT

Referring now to the drawings, a vibration damping device 1 is shown in FIG. 1 attached to a vehicle body 3. As shown, the damper 1 is secured to the vehicle body at a point rearwardly of the transmission over the drive line or propeller shaft.

The damper includes a tuned metal mass or weight 5 shaped to have two enlarged end heads 7 and 9 joined by an intermediate thinner section 11. The end heads 7 and 9 extend downwardly from the plane of the intermediate section 11 on opposite sides of the drive line housing 13. The weight 5 is tuned to vibrate when subjected to a predetermined range of vibratory cycles per second. When the body 3 attempts to vibrate in the predetermined range the energy attempting to cause the vibrations is transferred to the weight 5 which vibrates. As described hereafter in more detail, the transfer of energy takes place through an insulating connector 15. If the body were allowed to vibrate in a predetermined range without transferring the energy, the vibratory noise would be clearly audible and objectionable.

Weight 5 has a plurality of holes 16 therein in which the insulating assemblies 15 are located. Each insulator 15 comprises a rubber insulting or isolating bushing assembly 17. Bushing assemblies 17 may take various forms, but as shown, each includes an outer ring or sleeve 19 surrounding a rubber ring 21 and located in a hole 16. The inner periphery of the ring 21 engages an inner sleeve 23.

An upper plate 25 has a plurality of fasteners, such as bolts thereon, one for each hole 16 which bolts extend down through the body floor 27 and the sleeves 23 and through holes in a lower plate 29. Nuts secure the plate 29 to the both and sleeves 23. It will be seen that the weight 5 is metallically completely insulated from the body 3 by the rubber rings 19 in bushing assemblies 17.

Naturally the shape and size of the weight 5 may be varied. However, the shape shown is particularly advantageous in that it allows the device to be installed over a drive line housing.

It has been found that with regard to certain vehicle bodies, a weight on the order of approximately 13 pounds adapted to vibrate when the body is subjected to approximately 38–44 cycles/second, will be effective in preventing the vibratory noises normally accompanying such vibration from entering the passenger compartment. As the body attempts to vibrate in such a predetermined vibratory range, the energy is transferred through the connectors 15 to the tuned weight 5, which weight vibrates but does not cause the objectionable noise which would be created by the body if it were to vibrate in the aforenoted range.

In view of the foregoing, it will be seen that the several objects and other features of this invention are attained.

Although several embodiments of the invention have been disclosed and described, it is apparent that other embodiments and modifications of the invention are possible.

We claim:

1. Vibration damping apparatus for a vehicle body comprising a weight, means connecting said weight to said body, said means including a plurality of fasteners, a plurality of resilient insulators located in holes in said weight, said fasteners extending through said insulators and said body, said insulators transferring energy from said body to said weight when said body is subjected to vibration in a predetermined vibratory range, and said weight comprising two end head portions, an intermediate section thinner than said end heads joining said end heads together.

2. Vibration damping apparatus as set forth in claim 1 wherein each of said insulators includes an outer sleeve and an inner sleeve, and a rubber ring member between said outer and inner sleeves.

3. Vibration damping apparatus as set forth in claim 1 further including a lower plate located below said insulators, said fastening extending through said lower plate for connecting the apparatus to said vehicle body.

4. Vibration damping apparatus as set forth in claim 2 further including a lower plate, said lower plate having holes therein through which said fasteners extend, said inner sleeves surrounding said fasteners and contracting said lower plate adjacent the holes therein.

* * * * *